United States Patent
Talatinian et al.

(10) Patent No.: US 7,593,649 B1
(45) Date of Patent: Sep. 22, 2009

(54) METHOD AND APPARATUS FOR WIRED INFRARED DEMODULATION

(75) Inventors: Gerard Talatinian, Indianapolis, IN (US); Daniel Pierce, Brownsburg, IN (US)

(73) Assignee: Digital Networks North America, Inc., Santa Clara, CA (US)

( * ) Notice: Subject to any disclaimer, the term of this patent is extended or adjusted under 35 U.S.C. 154(b) by 704 days.

(21) Appl. No.: 10/935,517

(22) Filed: Sep. 7, 2004

Related U.S. Application Data (60) Provisional application No. 60/500,581, filed on Sep. 4, 2003.

(51) Int. Cl.
*H04B 10/06* (2006.01)

(52) U.S. Cl. .............. 398/202; 398/115; 398/118; 398/128; 398/130; 398/135; 398/136; 398/138; 455/151.2; 340/825.22; 340/825.69; 340/825.72; 348/734; 341/176

(58) Field of Classification Search ............... 398/106, 398/107, 202, 208, 209, 115, 118, 135, 138, 398/136, 155, 164, 128, 130; 340/825.69, 340/825.72, 825.57, 825.22; 455/41, 603, 455/151.2; 348/194.1, 734; 341/176
See application file for complete search history.

(56) References Cited

U.S. PATENT DOCUMENTS

| | | | | |
|---|---|---|---|---|
| 5,898,513 A * | 4/1999 | Gist et al. | .................. | 398/202 |
| 6,097,309 A * | 8/2000 | Hayes et al. | ........... | 340/825.69 |
| 6,097,520 A * | 8/2000 | Kadnier | .................. | 398/106 |
| 6,130,625 A * | 10/2000 | Harvey | ................ | 340/825.72 |
| 6,590,505 B1 * | 7/2003 | Matsui et al. | .......... | 340/825.72 |
| 6,602,001 B1 * | 8/2003 | Hatano et al. | .............. | 398/106 |
| 7,054,389 B2 * | 5/2006 | Yokogawa et al. | .......... | 375/340 |
| 2004/0022334 A1 * | 2/2004 | Roosli et al. | ............... | 375/345 |
| 2004/0181622 A1 * | 9/2004 | Kiser et al. | ................. | 710/72 |

\* cited by examiner

*Primary Examiner*—Hanh Phan
(74) *Attorney, Agent, or Firm*—McDonnell Boehnen Hulbert & Berghoff LLP (57) ABSTRACT

Method and system for processing a modulated WIR input signal. A digital device includes an input receiving circuit. This circuit receives the modulated WIR input signal and detects a modulation carrier pulse burst in the WIR input signal and generates a valid pulse signal. A pulse generating circuit is operatively coupled to the input receiving circuit and generates a pulse signal of a specific duration based in part on the pulse burst.

28 Claims, 6 Drawing Sheets

METHOD AND APPARATUS FOR WIRED INFRARED DEMODULATION

CROSS-REFERENCE TO RELATED APPLICATIONS

This application claims priority under 35 U.S.C. § 119 (e) from a provisional patent application Ser. No. 60/500,581 filed Sep. 4, 2003 entitled "Demodulating IR Input Using Digital Logic", which is herein entirely incorporated by reference and to which the reader is directed for further information.

BACKGROUND

1. Field of the Invention

The present invention is generally directed to processing modulated wired infra-red ("WIR") signals. More particularly, the present invention is directed to the demodulation of a modulated WIR signal. The invention is particularly useful in media management products such as televisions, video cassette recorders, stereos, DVD players, DVD and Music Managers, and other like devices. However, the invention is equally applicable to demodulating WIR signals in other scenarios as well.

2. Description of Related Art

Known media management products include a capability of being controlled externally by Wired Infrared ("WIR") signals. For example, one such media management device is the Fireball® DVD and Music Manager DVDM-100 offered and sold by Escient of Indianapolis, Ind. Such media management products usually require circuitry that receives and processes WIR signals since such signals are commonly generated by a variety of home control and/or automation systems. WIR signals may also be generated by off the shelf Infrared ("IR") repeater modules. This capability allows certain known devices to interface to such external control devices for the purposes of being integrated into a customer's existing installation. Integration provides a means of controlling such media management devices from existing premise's home automation control devices.

Figure 1:
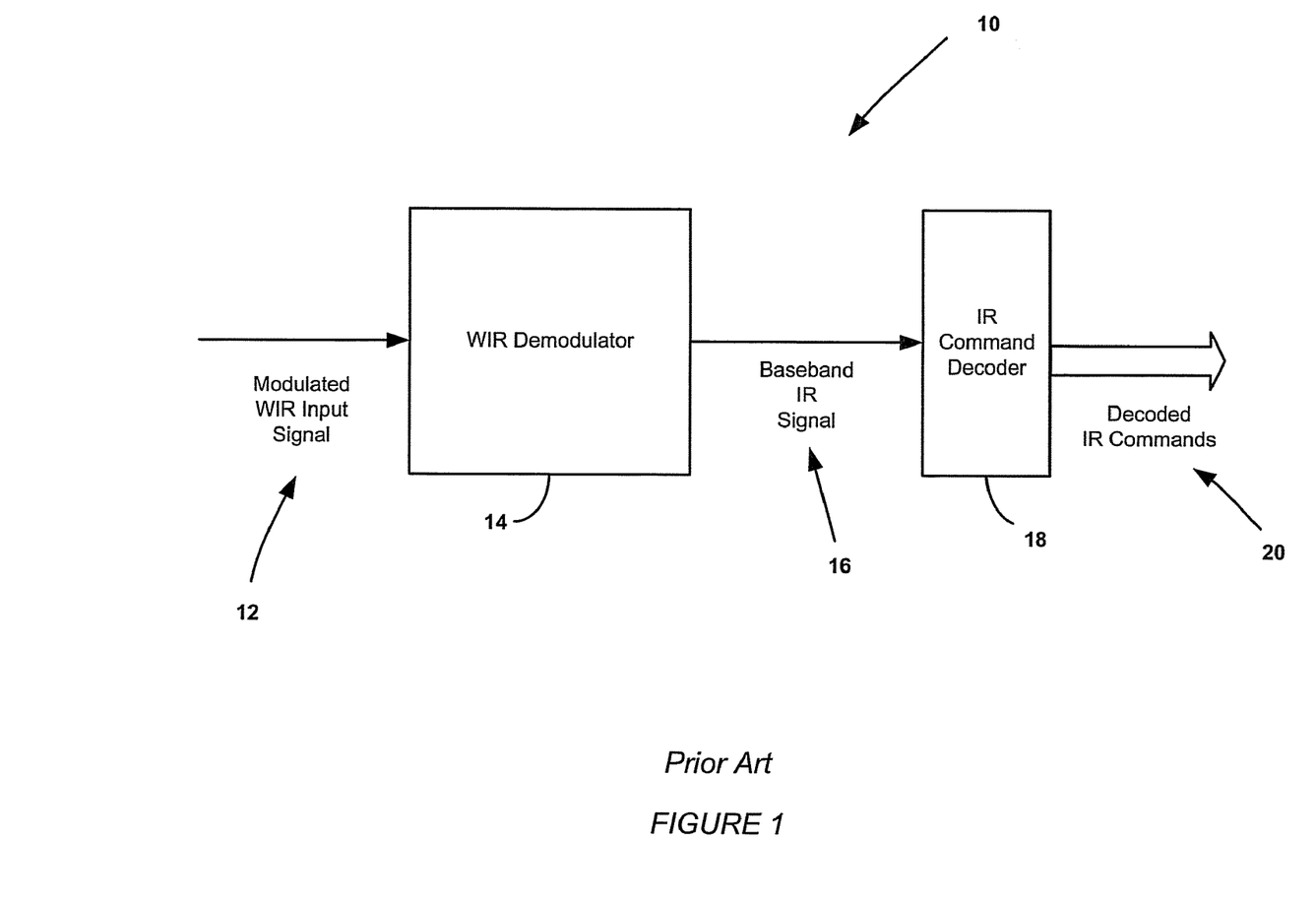
FIG. 1 is a block diagram depicting a typical arrangement of a WIR control input subsystem.

FIG. 1 illustrates a typical arrangement of a WIR control input subsystem 10. In this arrangement, subsystem 10 comprises essentially two processing elements. These two elements are operatively coupled to one another while receiving a modulated WIR input signal 12 and producing a baseband IR signal 16. This baseband IR signal 16 is then provided to an IR command decoder 18. IR command decoder 18 decodes signal 16 into an actual command 20 for operation of media management products such as televisions, video cassette recorders, stereos, DVD players, DVD and Music Managers, and other like devices.

In the architecture 10 illustrated in FIG. 1, the first processing element comprises an input signal demodulator and the second processing element comprises an IR command decoder. The first processing element, WIR demodulator 14, receives the modulated WIR input signal 12. WIR demodulator 14 typically strips the modulated WIR input signal of its carrier frequency. WIR demodulator 14 then provides a baseband demodulated IR signal 16 to an IR command decoder 18.

Baseband IR signal 16 is analyzed by IR command decoder 18. IR command decoder 18 decodes the baseband IR signal into a number of supported IR control commands. Such commands could include, but may not be limited to, such commands as Stop, Play, Eject, Rewind, Fast Forward, Skip, etc. This second processing element is typically implemented using a programmed microcontroller. The IR command decoder 18 then outputs a decoded IR command 20.

Figure 2A:
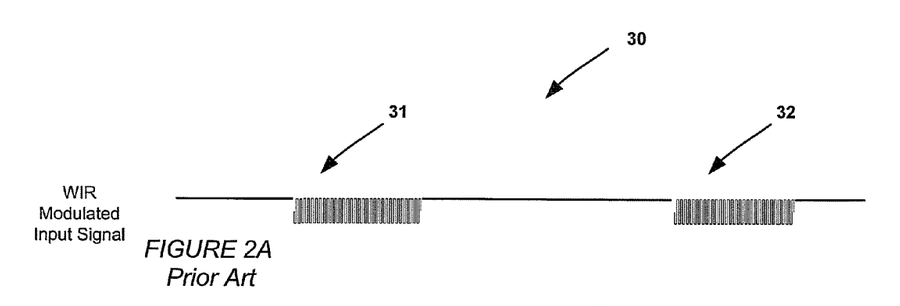
FIG. 2A illustrates a WIR modulated input signal.

FIG. 2A illustrates one arrangement 30 of a typical WIR modulated input signal, such as the WIR modulated input signal 12 illustrated in FIG. 1. Such a modulated input signal ordinarily comprises a carrier pulse burst comprising a plurality of pulses. For example, in FIG. 2A, WIR modulated input signal 12 comprises two pulse bursts 31, 32. However, those of ordinary skill in the relevant art will recognize that other modulated signal pulse arrangements may be used as well. In a typical arrangement, the modulated signal 30 will include a carrier frequency on the order of approximately 35 to 70 kHz. Other carrier frequencies may also be used.

Figure 2B:
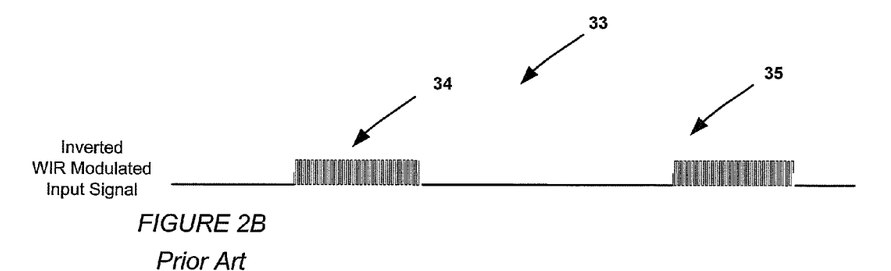
FIG. 2B illustrates an inverted WIR modulated input signal.
Figure 2C:
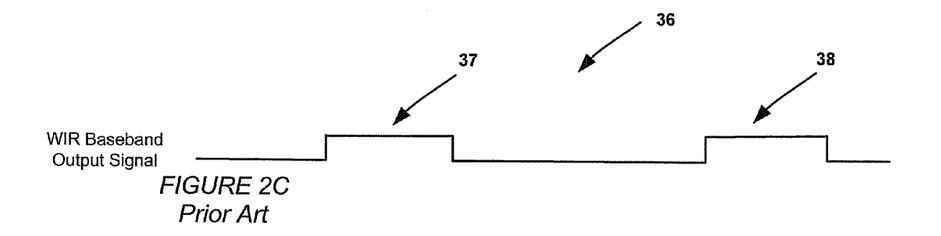
FIG. 2C illustrates a WIR baseband output signal.

FIG. 2B illustrates one arrangement 33 of an inverted WIR modulated input signal, such as the WIR modulated input signal 30 illustrated in FIG. 2A. As illustrated in FIG. 2A, the modulated input signal 33 comprises two inverted pulse bursts. In certain applications, the WIR modulated input signal may not be inverted before a WIR baseband output signal is generated. FIG. 2C illustrates one arrangement 36 of a typical WIR Baseband Output Signal, such as the WIR Baseband Output Signal 16 illustrated in FIG. 1. The WIR baseband output signal 36 is derived from WIR modulated input signal 30 of FIG. 2A or, alternatively, derived from WIR modulated input signal 33 of FIG. 2B.

Figure 3:
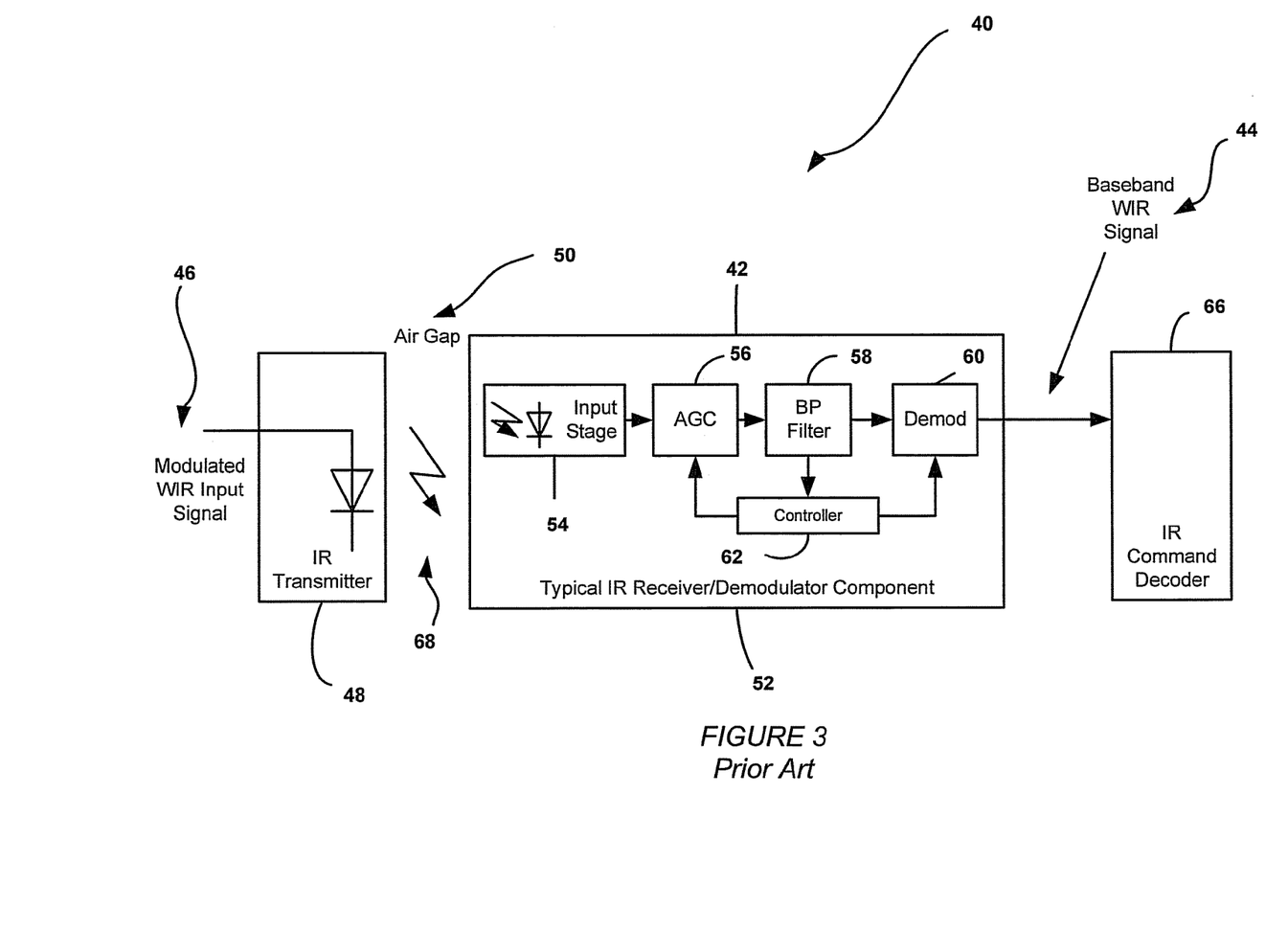
FIG. 3 illustrates a typical implementation of an existing analog component based WIR demodulator system.

Certain known media management products have implemented the above mentioned WIR demodulation device of the WIR input subsystem by using generally known infrared electronics components, primarily analog based infrared electronics components. One such typical implementation of a WIR demodulation apparatus 40 is illustrated in FIG. 3. As illustrated in FIG. 3, this known WIR demodulation apparatus 40 receives a modulated WIR input signal 46 and generates a baseband WIR signal 44 based on this input signal 46. WIR demodulation apparatus 40 comprises an IR transmitter 48 and an IR receiver/demodulator 52. IR transmitter 48 receives modulated WIR input signal 46, such as input signal 30 illustrated in FIG. 2A. IR transmitter 48 transmits an optical signal 68 across an air gap 50. Optical signal 68 is received by IR receiver/demodulator 52.

In this typical arrangement, IR receiver/demodulator 52 comprises various analog based electrical components. Such components include an input stage or an IR receiving device 54, an adjustable gain controller ("AGC") 56, a band pass filter 58, a demodulator 60, and a controller 62. Controller 62, which receives an input signal from band pass filter 58, provides an input to both AGC 56 as well as demodulator 60.

IR transmitter 48 converts modulated WIR input signal 46 to an emitted optical signal 68, preferably using an LED. Emitted optical signal 68 must then be aimed at IR receiver 54 which is part of IR receiver/demodulator 52. The IR receiver/demodulator is typically available as an off the shelf electronic component such as a Vishay part number TSOP1130, and various others. IR receiver/demodulator 52 generates baseband WIR signal 44 which is then provided to the IR command decoder 66.

Although the demodulator 40 has certain advantages, there are a number of disadvantages to using IR transmitter 48 along with the IR receiver/demodulator apparatus 52 illustrated in FIG. 3. For example, because modulated WIR input signal 46 must be converted to an optical signal 68, the apparatus requires an air gap 50. This air gap requirement adds additional requirements in calibrating the width of the air gap 50 as well as the power level of the transmitted optical signal 68 in order to ensure a proper optical detection at the input stage 54 and subsequent generation of baseband WIR signal 44.

Aside from the difficulty of maintaining adequate clearance between the IR transmitter and the input stage 54, providing this air gap results in a greater demand for surface area, especially surface area along a printed circuit board resulting in certain space limitations. Moreover, the typical IR receiver/demodulator 52 used in apparatus 40 is usually calibrated for proper operation around a fixed IR carrier frequency, $F_c$. This requires the actual carrier frequency F in WIR transmitted signal 68 to be centered around $F_c$ within a typical given operating tolerance of ±5% (i.e. $F=F_c\pm5\%$). This operating tolerance tends to provide a proper detection and demodulation of IR signal 68 resulting in a valid baseband WIR signal 44. Consequently, the apparatus 40 in FIG. 3 is not programmable so as to operate at a plurality of different carrier frequencies.

Therefore, a need exists for an improved system that does not require printed circuit board surface area to be used for an air gap. There is also a general need for an apparatus that does not rely on analog based devices, such as an analog demodulator. There is also a general need for an apparatus that is programmable, for example, a programmable demodulator that can efficiently and cost effectively demodulate more than one carrier frequency without costly hardware changeovers. Preferably, such a programmable demodulator may be field programmable and even more preferably, such a programmable demodulator may be programmable over the Internet and/or a phone line.

SUMMARY

According to an exemplary embodiment, a digital device for processing a modulated WIR input signal is provided. The device includes an input receiving circuit that receives the modulated WIR input signal. The input receiving circuit detects modulation carrier pulses in the WIR input signal and generates a valid pulse signal. A pulse generating circuit is operatively coupled to the input receiving circuit and generates a pulse signal based in part on said valid pulse signal.

An alternative exemplary embodiment may take the form of a method for digitally processing a modulated WIR input signal. The method includes the steps of detecting a valid modulation carrier pulse burst in the modulated WIR input signal and generating a valid pulse signal based in part on the modulated WIR input signal. A pulse signal is generated based in part on the valid pulse burst.

In another respect, an exemplary embodiment may take the form of a digital wireless infrared demodulator for extracting a baseband IR control signal from a modulated WIR input signal. The demodulator comprises a carrier pulse detector for receiving the modulated WIR input signal and generating a valid pulse signal based in part on at least one input parameters. A pulse stretcher is operatively coupled to an output of the carrier pulse detector and receives the plurality of pulses. The carrier pulse stretcher generates a baseband WIR signal based in part on the plurality of pulses.

These as well as other aspects and advantages of the present invention will become apparent to those of ordinary skill in the art by reading the following detailed description, with appropriate reference to the accompanying drawings.

DESCRIPTION OF THE DRAWINGS

An exemplary embodiment of the present invention is described herein with reference to the drawings, in which.

Exemplary embodiments of the present invention have been described. Those skilled in the art will understand, however, that changes and modifications may be made to these embodiments without departing from the true scope and spirit of the present invention, which is defined by the claims.

DESCRIPTION

Figure 4:
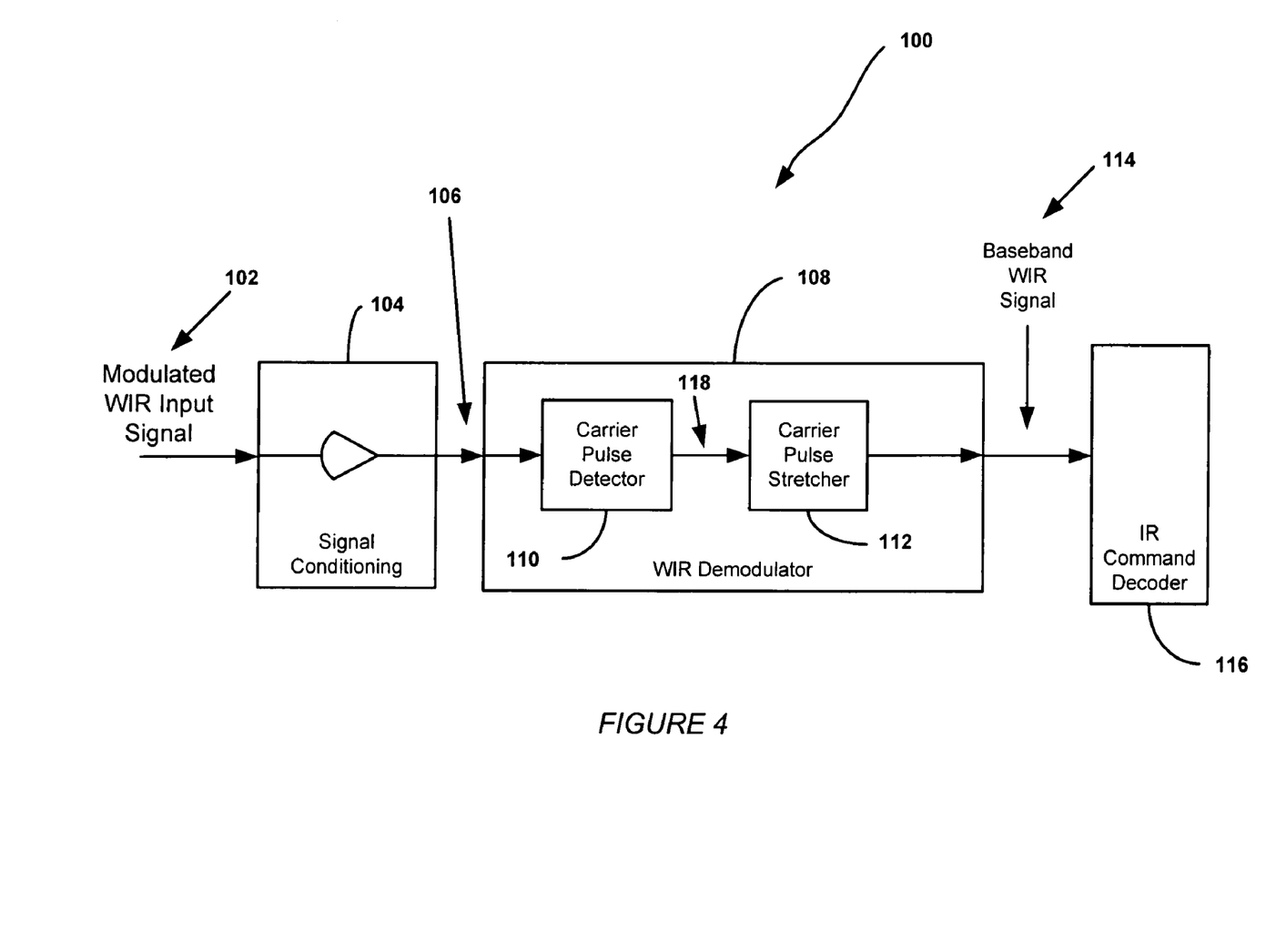
FIG. 4 illustrates one arrangement of a digital processing device for extracting a baseband IR signal from a modulated WIR input signal.
Figure 5:
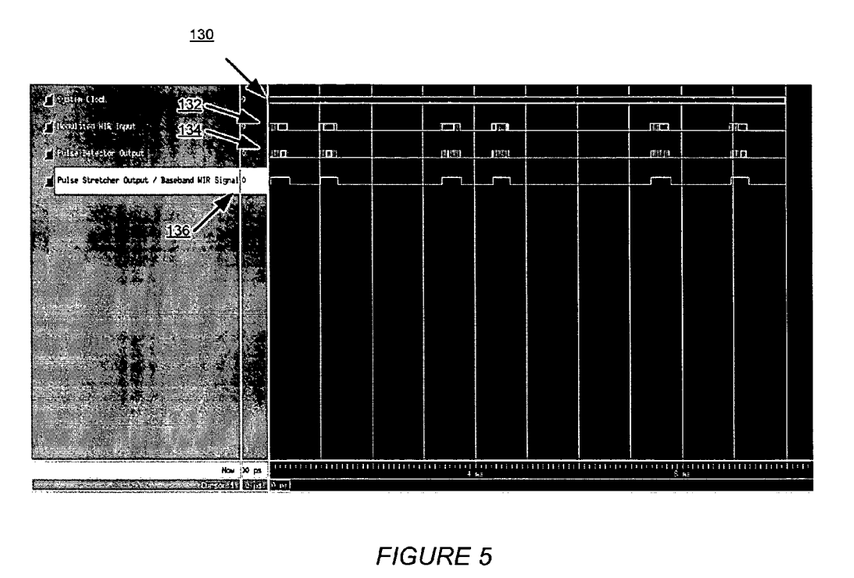
FIG. 5 illustrates a first result of an actual simulation of a synthesized CPLD implementation of the digital WIR demodulator illustrated in FIG. 4.
Figure 6:
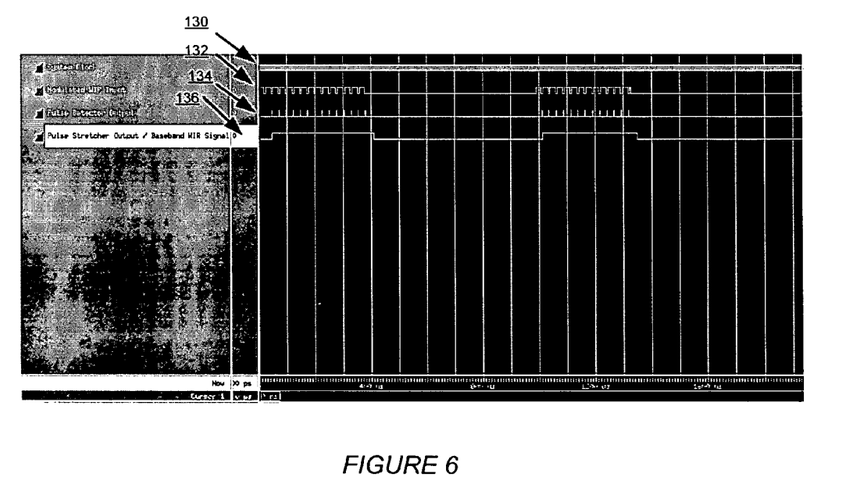
FIG. 6 illustrates another result of an actual simulation of a synthesized CPLD implementation of the digital WIR demodulator illustrated in FIG. 4.
Figure 7:
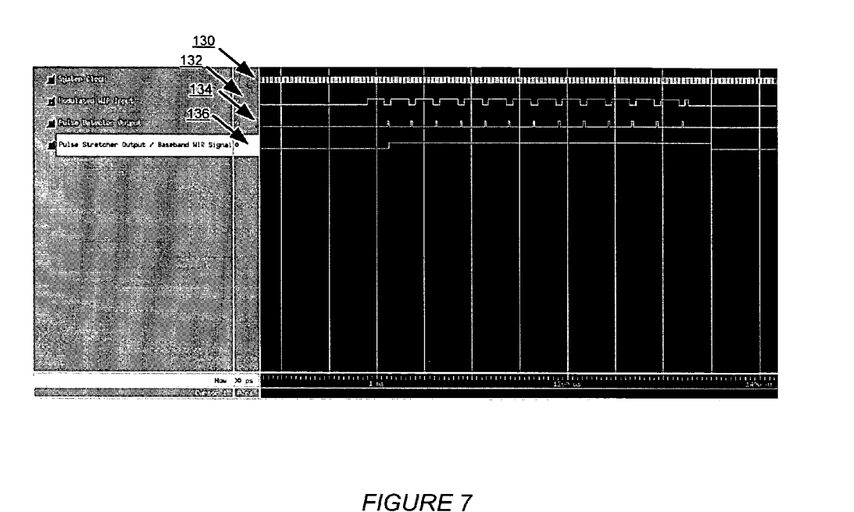
FIG. 7 illustrates another result of an actual simulation of a synthesized CPLD implementation of the digital WIR demodulator illustrated in FIG. 4.
Figure 8:
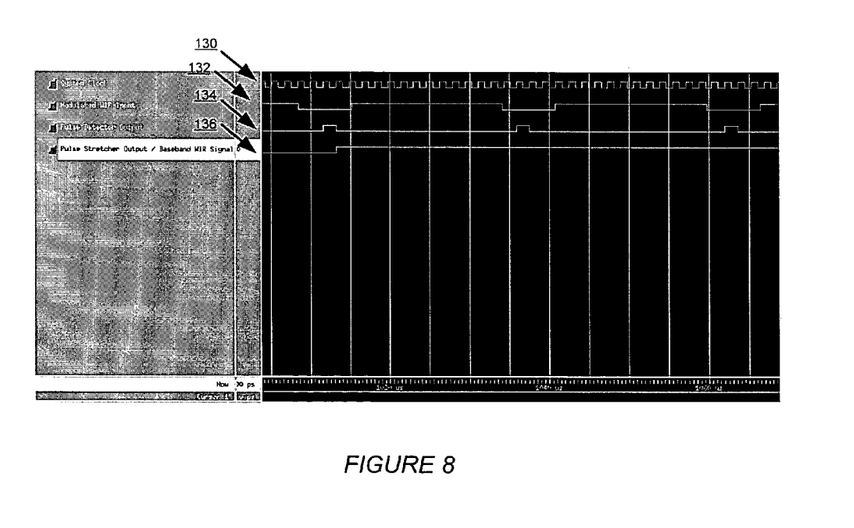
FIG. 8 illustrates yet another result of an actual simulation of a synthesized CPLD implementation of the digital WIR demodulator illustrated in FIG. 4.

FIG. 4 illustrates one arrangement of a digital processing device 100 for extracting a baseband IR control signal from a modulated WIR input signal. As shown in FIG. 4, in one preferred approach, digital processing device 100 comprises a signal conditioning device 104 and a WIR demodulator 108. In one preferred approach, WIR demodulator 108 comprises an input receiving circuit such as a carrier pulse detector 110 and a pulse generating circuit such as a carrier pulse stretcher 112. Baseband WIR signal 114 generated by carrier pulse stretcher 112 is provided to IR command decoder 116. IR command decoder 116 decodes signal 114 into an actual command for operation of a media management product and other like devices.

Signal Conditioning

In one approach, a signal conditioning device 104 is used to condition input modulated WIR input signal 102 before a signal, such as signal 106, is provided to WIR demodulator 108. Signal conditioning device 104 may be helpful to ensure that an appropriate logic-high and logic-low voltage levels and transition times between these levels are present to the modulated WIR input signal in accordance with the digital logic technology used in implementing the demodulator. For example, in one arrangement, the WIR demodulator 108 comprises a programmable device, such as a complex programmable logic device ("CPLD"). However, other arrangements are also possible, including but not limited to, Field Programmable Gate Arrays ("FPGA"), discrete logic implementations and masked logic implementations.

In a preferred approach, the use of signal conditioning device 104 is optional. For example, the rise time $T_R$, fall time $T_F$, logic low level $V_H$, and logic high level $V_L$ of the input WIR signal may need to conform to those required by the specific digital semiconductor technology used in the hardware implementation of WIR demodulator 108, carrier pulse detector input 110. Signal conditioning device 104 may not be required in certain circumstances. For example, signal conditioning 104 may not be required if a supplied WIR modulated input signal parameters $T_R, T_F, V_H$ and $V_L$ already conform to or may be tolerated by the type of digital logic used. In one preferred approach, signal conditioning device 104 comprises an operational amplifier configured as a voltage comparator. This operational amplifier may be set to have a threshold voltage set halfway between an expected maximum input voltage $V_{max}$ and an expected minimum input voltage $V_{min}$ on modulated WIR Input Signal 102. In such an approach, the output of the comparator conditioned WIR signal 106 will swing between $V_L=0$ and $V_H=V_{cc}$, as appropriate for the input logic levels required by the CPLD device used to implement digital demodulator 108.

In a preferred approach where an optional signal conditioning device 104 is provided, conditioned modulated WIR input signal 106 is provided to WIR demodulator 108. In one preferred approach, WIR demodulator 108 comprises a Complex Programmable Logic Device ("CPLD"). Alternatively, WIR demodulator does not comprise a programmable device, but may be implemented using mask programmed devices, Field Programmable Gate Array devices ("FPGA"), or discrete components. In an arrangement where a signal conditioning device 104 is not implemented, the modulated WIR input signal 102 is provided directly to WIR demodulator 108.

Input Receiving Circuit

In one preferred arrangement, WIR demodulator 108 comprises an input receiving circuit 110 that is operatively coupled to a pulse generating circuit 112. Input receiving circuit 110, which acts as a carrier pulse detector, of the digital demodulator 108 monitors input signal 106 or 102 and detects valid modulation carrier pulses. One of the primary functions of input receiving circuit 110 is that this circuit filters out spurious pulses in input signal 106 that may have been erroneously introduced into modulated WIR input signal 102 or 106, such as noise.

In one approach, input receiving circuit 110 is driven by a system clock $F_{sys}$. Preferably, the system clock $F_{sys}$ runs at a clock frequency that is higher than the WIR carrier frequency $F_{mod}$. In this approach, incoming carrier pulses are measured in time based on the system clock $F_{sys}$. Therefore, individual WIR carrier pulses within carrier pulse bursts, such as the carrier pulse bursts 31, 32 illustrated in FIG. 2A, falling within a preset minimum (i.e., $PWc_{min}$) and a maximum pulse width duration (i.e., $PWc_{max}$) limits will be detected as a valid pulse. Other pulses that do not fall within these preset minimum and maximum limits will be ignored, that is, these signals will be filtered out. Valid carrier pulses, such as valid carrier pulses 118 illustrated in FIG. 4, are signaled to the stage downstream. Preferably, valid carrier pulses are signaled to the stage downstream by driving a data pulse of a duration equal to one system clock period.

The values of $PWc_{min}$ and $PWc_{maxx}$ operating parameters used in detecting valid input WIR carrier pulses are preferably determined based on the range of WIR input signal carrier frequencies of interest (i.e. in the range $Fc_{min}$ to $Fc_{max}$), and the range of allowable carrier pulse duty cycles (i.e. in the range $DCc_{min}$ to $DCc_{max}$). Given these WIR input signal operating parameters, the minimum duration for a valid pulse $PWc_{min}$ can be determined as $PWc_{min}=(DCc_{min}*(1/Fc_{max}))$ seconds. Similarly, the maximum duration for a valid pulse $PWc_{max}$ can be determined as $PWc_{max}=(DCc_{max}*(1/Fc_{min}))$ seconds. In the system implementation, the time values $PWc_{min}$ and $PWc_{max}$ are expressed in terms of system clock periods units $T_{sys}$ (i.e. $T_{sys}=1/F_{sys}$) respectively as $PWc_{min}/T_{sys}$ and $PWc_{max}/T_{sys}$. The resulting values are further rounded to integer values as $APWc_{min}$=RoundUp($PWc_{min}/T_{sys}$) and $APWc_{max}$=RoundDown($PWc_{max}/T_{sys}$).

In one preferred approach, a computerized spreadsheet may be used to generate the required design parameters $APWc_{min}$ and $APWc_{max}$ based on the WIR signal input parameters $Fc_{min}$, $Fc_{max}$, $DCc_{min}$ and $DCc_{max}$ and the system clock frequency $F_{sys}$. The generated values of $APWc_{min}$ and $APWc_{max}$ may be directly used in a parameterized synthesizable VHDL design module for the automatic generation of the required hardware for the carrier pulse detector 110 module to be implemented in a CPLD device of choice.

Pulse Generating Circuit

Valid carrier pulse pulses 118 generated by input receiving circuit 110 of the WIR demodulator 100 are communicatively coupled to a pulse generating circuit 112. Pulse generating circuit 112 is used to stretch incoming, valid pulses and to generate an output pulse signal preferably of a specific duration. In one approach, pulse generating circuit 112 acts as a valid carrier pulse stretcher to stretch detected valid pulses to cover a maximum carrier pulse period anticipated in a carrier frequency range of interest. By generating a pulse of this length, this guarantees that the output signal of carrier pulse stretcher 112, that is baseband WIR signal 114, remains in a high state for at least the maximum anticipated modulation carrier period. In this manner, during a modulation carrier pulse burst (i.e., during the presence of an active modulation carrier on the input WIR signal), carrier pulse stretcher 112 can be re-triggered before a stretched pulse reaches a maximum stretch duration $T_{stretch}$.

The desired output signal 114 from pulse generating circuit 112 is therefore an active high signal for roughly the duration of consecutive modulation carrier pulses on the input WIR signal.

In one arrangement, the value of $T_{stretch}$ is preferably determined based on the range of WIR input signal carrier frequencies of interest (i.e., in the range $Fc_{min}$ to $Fc_{max}$). Given these WIR input signal operating parameters, the minimum value for $T_{stretch}$ that guarantees an active high signal for the duration of consecutive modulation carrier pulses on the input WIR signal can be determined to be the maximum anticipated input carrier pulse period $T_{stretch}=Tc_{max}=1/Fc_{min}$. This stretch period can be expressed in terms of stretch factor by which to extend a single system clock pulse wide valid pulse signal 118 in order to maintain a corresponding high level for the required time on the baseband WIR signal 114 as $PSF=T_{stretch}/T_{sys}=(1/Fc_{min})/(1/F_{sys})=F_{sys}/Fc_{min}$. The resulting stretch factor may be rounded up to an integer value as $APSF$=Round Up($PSF$)=Round Up($F_{sys}/FC_{min}$). In one preferred approach, a computerized spreadsheet may be used to generate the required design parameter APSF based on the WIR signal input parameter $FC_{min}$ and the system clock frequency $F_{sys}$. The generated value of APSF may be directly used in a parameterized synthesizable VHDL design module for the automatic generation of the required hardware for the carrier pulse stretcher 112 module to be implemented in a CPLD device of choice.

Input Parameters

Given the desired WIR input signal characteristics, the design parameters used in the synthesis of the digital circuit may be determined by using a set of calculations as discussed above. These calculations may be implemented in a computerized spreadsheet that allows a circuit designer to input the system clock frequency ($F_{sys}$), minimum allowable modulation carrier frequency ($Fc_{min}$), the maximum allowable modulation carrier frequency ($Fc_{max}$), the minimum allowable modulation carrier pulse duty cycle ($DCc_{min}$), and the maximum allowable modulation carrier duty cycle ($DCc_{cmax}$). Based on the above input parameters, the three key parameters used in the circuit design are generated, as well as actual limits achievable on the provided input parameters based on the specified system clock frequency.

Table 1 below illustrates various formulae that may be used to derive certain demodulator parameters. For example, Table 1 identifies five input parameters: CPLD System Clock, Minimum Allowable Modulation Carrier Frequency, Maximum Allowable Carrier Frequency, Target Minimum Allowable Carrier Duty Cycle, and Target Maximum Allowable Carrier Duty Cycle. Based on these input parameters, and as shown below, various intermediate parameters may be derived:

| Input parameters: | |
|---|---|
| CPLD System Clock: | $F_{sys}$ (in Hz) |
| Min Allowable Modulation Carrier Frequency: | $Fc_{min}$ (in Hz) |
| Max Allowable Carrier Frequency: | $Fc_{max}$ (in Hz) |
| Target Minimum Allowable Carrier Duty Cycle: | $DCc_{min}$ (percentage) |
| Target Maximum Allowable Carrier Duty Cycle: | $DCc_{max}$ (percentage) |
| Derived intermediate parameters: | |
| CPLD System Period: | $T_{sys} = 1/F_{sys}$ |
| Min Carrier Period: | $Tc_{min} = 1/Fc_{max}$ |
| Max Carrier Period: | $Tc_{max} = 1/Fc_{min}$ |
| Target Min Allowed Carrier Pulse Width: | $PWc_{min} = DCc_{min} * Tc_{min}$ |
| Target Min Allowed Carrier Pulse Width in system clock cycles: | $=PWc_{min}/T_{sys}$ |
| Target Max Allowed Carrier Pulse Width: | $PWc_{max} = DCc_{max} * Tc_{max}$ |
| Target Max Allowed Carrier Pulse Width in sys clock cycles: | $=PWc_{max}/T_{sys}$ |
| Actual Min Allowed Carrier Pulse Width (in system clock cycles): | $APWc_{min} = RoundUp (PWc_{min}/T_{sys})$ |
| Actual Min Allowed Carrier Pulse Width (in seconds): | $=APWc_{min} * T_{sys}$ |
| Actual Min Allowed Carrier Duty Cycle (percentage): | $=(APWc_{min} * T_{sys})/(Tc_{min})$ |
| Actual Max Allowed Carrier Pulse Width (in system clock cycles): | $APWc_{max} = RoundDown (PWc_{max}/T_{sys})$ |
| Actual Max Allowed Carrier Pulse Width (in seconds): | $=APWc_{max} * T_{sys}$ |
| Actual Max Allowed Carrier Duty Cycle (percentage): | $=(APWc_{max} * T_{sys})/(Tc_{max})$ |
| Target Carrier Pulse Stretch Factor (Min Carrier Frequency): | $=F_{sys}/Fc_{min}$ |
| Target Carrier Pulse Stretch Factor (Max Carrier Frequency): | $=F_{sys}/Fc_{max}$ |
| Actual Carrier Pulse Stretch Factor (in sys clock periods): | $APSF = RoundUp (F_{sys}/Fc_{min})$ |
| Actual Carrier Pulse Delta Time (in seconds): | $=APSF * T_{sys}$ |
| Derived final VHDL design parameters: | |
| MIN_PULSE_COUNT: | $=APWc_{min}$ |
| MAX_PULSE_COUNT: | $=APWc_{max}$ |
| PULSE_STRETCH_FACTOR: | $=APSF$ |

Table 2 below illustrates a sample design parameter derivation using the parameters provided in Table 1. In the sample illustrated in Table 2, a 614.4 KHz system clock and a desired input WIR carrier frequency range of 36 kHz to 40 KHz with a minimum allowable WIR carrier pulse duty cycle range of 20% to 90% was used.

| | | |
|---|---|---|
| CPLD System Clock | 614400.0 Hz | |
| CPLD System Period | 1.627604E−06 Seconds | |
| Min Carrier Frequency | 36000 Hz | −5.26% off center |
| Center Carrier Frequency | 38000 Hz | |
| Max Carrier Frequency | 40000 Hz | 5.26% off center |
| Min Carrier Period | 2.500000E−05 Seconds | |
| Center Carrier Period | 2.631579E−05 Seconds | |
| Max Carrier Period | 2.777778E−05 Seconds | |
| Target Min Allowed Carrier Duty Cycle | 20% Of Min Carrier Period | |
| Target Min Allowed Carrier Pulse Width | 5.000000E−06 Seconds | |
| Target Min Allowed Carrier Pulse Width | 3.072 System Clock Periods | |
| Actual Min Allowed Carrier Pulse Width | 4 System Clock Periods | |
| Actual Min Allowed Carrier Pulse Width | 6.510417E−06 Seconds | |
| Actual Min Allowed Carrier Duty Cycle | 26% Of Min Carrier Period | |
| Target Max Allowed Carrier Duty Cycle | 90% Of Max Carrier Period | |
| Target Max Allowed Carrier Pulse Width | 2.500000E−05 Seconds | |
| Target Max Allowed Carrier Pulse Width | 15.360 System Clock Periods | |
| Actual Max Allowed Carrier Pulse Width | 15 System Clock Periods | |
| Actual Max Allowed Carrier Pulse Width | 2.441406E−05 Seconds | |
| Actual Max Allowed Carrier Duty Cycle | 88% Of Max Carrier Period | |
| Target Carrier Pulse Stretch Factor (Min Carrier Frequency) | 17.067 System Clock Periods | |
| Target Carrier Pulse Stretch Factor (Center Carrier Frequency) | 16.168 System Clock Periods | |
| Target Carrier Pulse Stretch Factor (Max Carrier Frequency) | 15.360 System Clock Periods | |
| Actual Carrier Pulse Stretch Factor | 18 System Clock Periods | |
| Actual Carrier Pulse Delta Time | 2.929688E−05 Seconds | |

-continued

| VHDL Design Parameters Used: | |
| --- | --- |
| MIN_PULSE_COUNT | 4 |
| MAX_PULSE_COUNT | 15 |
| PULSE_STRETCH_FACTOR | 18 |

As can be seen from Table 2, these input parameters will result in the following final design parameters: MIN_PULSE_COUNT of 4; MAX_PULSE_COUNT of 15, and PULSE_STRETCH_FACTOR of 18.

Table 3 shows an alternative design parameter derivation for the same WIR input signal characteristics for a design based on a 1 MHz system clock frequency Fsys=1 MHz.

| | | |
| --- | --- | --- |
| CPLD System Clock | 1000000.0 Hz | |
| CPLD System Period | 1.000000E−06 Seconds | |
| Min Carrier Frequency | 36000 Hz | −5.26% off center |
| Center Carrierr Frequency | 38000 Hz | |
| Max Carrier Frequency | 40000 Hz | 5.26% off center |
| Min Carrier Period | 2.500000E−05 Seconds | |
| Center Carrier Period | 2.631579E−05 Seconds | |
| Max Carrier Period | 2.777778E−05 Seconds | |
| Target Min Allowed Carrier Duty Cycle | 20% Of Min Carrier Period | |
| Target Min Allowed Carrier Pulse Width | 5.000000E−06 Seconds | |
| Target Min Allowed Carrier Pulse Width | 5.000 System Clock Periods | |
| Actual Min Allowed Carrier Pulse Width | 5 System Clock Periods | |
| Actual Min Allowed Carrier Pulse Width | 5.000000E−06 Seconds | |
| Actual Min Allowed Carrier Duty Cycle | 20% Of Min Carrier Period | |
| Target Max Allowed Carrier Duty Cycle | 90% Of Max Carrier Period | |
| Target Max Allowed Carrier Pulse Width | 2.500000E−05 Seconds | |
| Target Max Allowed Carrier Pulse Width | 25.000 System Clock Periods | |
| Actual Max Allowed Carrier Pulse Width | 25 System Clock Periods | |
| Actual Max Allowed Carrier Pulse Width | 2.500000E−05 Seconds | |
| Actual Max Allowed Carrier Duty Cycle | 90% Of Max Carrier Period | |
| Target Carrier Pulse Stretch Factor (Min Carrier Frequency) | 27.778 System Clock Periods | |
| Target Carrier Pulse Stretch Factor (Center Carrier Frequency) | 26.316 System Clock Periods | |
| Target Carrier Pulse Stretch Factor (Max Carrier Frequency) | 25.000 System Clock Periods | |
| Actual Carrier Pulse Stretch Factor | 28 System Clock Periods | |
| Actual Carrier Pulse Delta Time | 2.800000E−05 Seconds | |
| VHDL Design Parameters Used: | | |
| MIN_PULSE_COUNT | 5 | |
| MAX_PULSE_COUNT | 25 | |
| PULSE_STRETCH_FACTOR | 28 | |

As can be seen from Table 3, the design parameters used are different from those design parameters calculated in Table 2. For example, increasing the system clock frequency $F_{sys}$ to 1 MHz results in the following increased final design parameters: MIN_PULSE_COUNT of 5; MAX_PULSE_COUNT of 25, and PULSE_STRETCH_FACTOR of 28.

Listings 1 through 3 provided below provide one possible implementation of the above described digital demodulation system using synthesizable VHDL code. Preferably, this system may be fitted on a CPLD.

Listing 1, provided below, provides a VHDL top design module for the WIR Demodulator 108 in FIG. 4:

```
-------------------------------------------------------------------------
-- Module Name:    irdemodulator.vhd
--
-- Author:         Gerard Talatinian
--
-- Description:    IR signal demodulator.
--
-- Portability:    Generic
--
-- Synthesis:      Yes
--
-- Target:         Generic
--
```

-continued

```
-- Notes:
--
-------------------------------------------------------------------------
-------------------------------------------------------------------------
-- The pulse detector and pulse stretcher generics are determined based on the
-- following spreadsheet calculations. These calculation are based on the target
-- IR modulation carrier frequency range that needs to be supported and the
-- system clock at which the system operates:
--
-- Document Date          8/25/2003
-- Document Revision      1.0
--
-- CPLD System Clock      614400.0          Hz
-- CPLD System Period     1.627604E-06      Seconds
--
-- Min Carrier Frequency           36000 Hz (-5.26% off center)
-- Center Carrierr Frequency       38000 Hz
-- Max Carrier Frequency           40000 Hz (5.26% off center)
--
-- Min Carrier Period              2.500000E-05 Seconds
-- Center Carrier Period           2.631579E-05 Seconds
-- Max Carrier Period              2.777778E-05 Seconds
--
-- Target Min Allowed Carrier Duty Cycle      20%           Of Min Carrier Period
-- Target Min Allowed Carrier Pulse Width     5.000000E-06  Seconds
-- Target Min Allowed Carrier Pulse Width     3.072         System Clock Periods
-- Actual Min Allowed Carrier Pulse Width     4             System Clock Periods
-- Actual Min Allowed Carrier Pulse Width     6.510417E-06  Seconds
-- Actual Min Allowed Carrier Duty Cycle      26%           Of Min Carrier Period
--
-- Target Max Allowed Carrier Duty Cycle      90%           Of Max Carrier Period
-- Target Max Allowed Carrier Pulse Width     2.500000E-05  Seconds
-- Target Max Allowed Carrier Pulse Width     15.360        System Clock Periods
-- Actual Max Allowed Carrier Pulse Width     15            System Clock Periods
-- Actual Max Allowed Carrier Pulse Width     2.441406E-05  Seconds
-- Actual Max Allowed Carrier Duty Cycle      88%           Of Max Carrier Period
--
-- Target Carrier Pulse Stretch Factor(Min Carrier Freq)     17.067    SysClk  Prds
-- Target Carrier Pulse Stretch Factor(Center Carrier Freq)  16.168    SysClk  Prds
-- Target Carrier Pulse Stretch Factor(Max Carrier Freq)     15.360    SysClk  Prds
-- Actual Carrier Pulse Stretch Factor                       18        SysClk  Prds
-- Actual Carrier Pulse Delta Time                           2.929688E-05  Sec
--
--
-- VHDL Design Parameters Used:
-- MIN_PULSE_COUNT       4
-- MAX_PULSE_COUNT       15
-- PULSE_STRETCH_FACTOR  18
--
-------------------------------------------------------------------------
library ieee;
use ieee.std_logic_1164.all;
entity ir_demodulator is
    port
    (
        clk      : in   std_logic;
        data_in  : in   std_logic;
        data_out : out  std_logic
    );
end entity ir_demodulator;
architecture ir_demodulator_arch of ir_demodulator is
    component pulse_detector
        generic
        (
            min_pulse_width : positive;
            max_pulse_width : positive
        );
        port
        (
            clk:           in   std_logic;
            reset:         in   std_logic;
            data:          in   std_logic;
            pulse_detect:  out  std_logic
        );
    end component;
    component pulse_stretcher
        generic
        (
            stretch_factor : integer
```

```
            );
            port
            (
                clk:        in   std_logic;
                p_input:    in   std_logic;
                p_output:   out  std_logic
            );
        end component;
        signal   reset        : std_logic;
        signal   valid_pulse  : std_logic;
        ------------------------------------------------------------------------
        -- Design generics based on computations listed above.
        ------------------------------------------------------------------------
        constant c_min_pulse_width      : positive := 4;
        constant c_max_pulse_width      : positive := 15;
        constant c_pulse_stretch_factor : positive := 18;
begin
        pulse_detector unit:
            pulse_detector
                generic map
                (
                    min_pulse_width => c_min_pulse_width,
                    max_pulse_width => c_max_pulse_width
                )
                port map
                (
                    clk          => clk,
                    reset        => reset,
                    data         => data_in,
                    pulse_detect => valid_pulse
                );
        pulse_stretcher_unit:
            pulse_stretcher
                generic map
                (
                    stretch_factor => c_pulse_stretch_factor
                )
                port map
                (
                    clk      => clk,
                    p_input  => valid_pulse,
                    p_output => data_out
                );
        -- Reset tied low for now
        reset <= '0';
end ir_demodulator_arch;
```

Listing 2, provided below, provides a VHDL design module for the Carrier Pulse Detector 110 in FIG. 4. This design module is in turn instantiated in the top level VHDL design module in listing 1 above:

```
------------------------------------------------------------------------
-- Module Name:   pulsedetector.vhd
--
-- Author:        Gerard Talatinian
--
-- Description:   Valid pulse detector.
--
-- Portability:   Generic
--
-- Synthesis:     Yes
--
-- Target:        Generic
--
-- Notes:
--
------------------------------------------------------------------------
library ieee;
use ieee.std_logic_1164.all;
use ieee.std_logic_arith.all;
use ieee.std_logic_unsigned.all;
entity pulse_detector is
    generic
    (
        min_pulse_width : positive;
        max_pulse_width : positive
    );
    port
    (
        clk:          in   std_logic;
        reset:        in   std_logic;
        data:         in   std_logic;
        pulse_detect: out  std_logic
    );
begin
    ------------------------------------------------------
    -- Sanity check on specified pulse width limits.
    -- (Assert is ok in entity declarative
    -- region - passive statement).
    ------------------------------------------------------
    assert (min_pulse_width <= max_pulse_width)
        report "Invalid pulse width limits specified"
        severity error;
end entity pulse_detector;
architecture pulse_detector_arch of pulse_detector is
    ----------------------------------
    -- Manual state assignments.
    ----------------------------------
```

-continued

```
        constant state_init      : unsigned (1 downto 0) :="00";
        constant state_pre_pulse : unsigned (1 downto 0) :="01";
        constant state_counting  : unsigned (1 downto 0) :="10";
        -----------------------------
        -- State signals.
        -----------------------------
        signal state    : unsigned (1 downto 0);
begin
        ---------------------------------------------
        -- Pulse detector proceural description.
        ---------------------------------------------
        pulse_detector_proc:
        process (state, data, clk, reset)
                ----------------------------------------------------------
                -- Pulse width counter and terminal count value.
                ----------------------------------------------------------
                variable count: integer range 0 to max_pulse_width + 1 := 0;
                constant terminal_count: integer := max_pulse_width + 1;
        begin
                if (reset = '1') then
                        -----------------------------
                        -- Asynchrounous reset.
                        -----------------------------
                        pulse_detect <= '0';
                        count := 0;
                        state <= state_init;
                elsif (clk'event and clk = '1') then
                        case state is
                                when state_init =>
                                        -- Pulse detect output
                                        pulse_detect <= '0';
                                        -- Counter
                                        count := 0;
                                        -- Next state
                                        if (data = '0') then
                                                state <= state_pre_pulse;
                                        else
                                                state <= state_init;
                                        end if;
                                when state_pre_pulse =>
                                        -- Pulse detect output
                                        if
                                        (
                                                count >= min_pulse_width
                                                and
                                                count <= max_pulse_width
                                        ) then
                                                pulse_detect <= '1';
                                        else
                                                pulse_detect <= '0';
                                        end if;
                                        -- Counter
                                        count := 0;
                                        -- Next state
                                        if (data = '0') then
                                                state <= state_pre_pulse;
                                        else
                                                state <= state_counting;
                                        end if;
                                when state_counting =>
                                        -- Pulse detect output
                                        pulse_detect <= '0';
                                        -- Counter
                                        if (count = terminal_count) then
                                                count := count;
                                        else
                                                count := count +1;
                                        end if;
                                        -- Next state
                                        if (data = '0') then
                                                state <= state_pre_pulse;
                                        else
                                                state <= state_counting;
                                        end if;
                                when others =>
                                        -- Pulse detect output
                                        pulse_detect <= '0'
                                        -- Counter
                                        count := 0;
```

-continued

```
                                        -- Next state
                                        state <= state_init;
                        end case;
                end if;
        end process pulse_detector_proc;
end architecture pulse_detector_arch;
```

Listing 3, provided below, provides a VHDL design module for the carrier pulse stretcher 112 illustrated in FIG. 4. This design module is in turn instantiated in the top level VHDL design module in listing 1 above:

```
--------------------------------------------------------------------------
-- Module Name:    pulsedetector.vhd
--
-- Author:         Gerard Talatinian
--
-- Description:    Pulse stretcher.
--
-- Portability:    Generic
--
-- Synthesis:      Yes
--
-- Target:         Generic
--
-- Notes:
--
--------------------------------------------------------------------------
library IEEE;
use IEEE.std_logic_1164.all;
use IEEE.std_logic_arith.all;
entity pulse_stretcher is
        generic
        (
                stretch_factor : integer := 1
        );
        port
        (
                clk:       in   std_logic;
                p_input:   in   std_logic;
                p_output:  out  std_logic
        );
end entity pulse_stretcher;
architecture pulse_stretcher_arch of pulse_stretcher is
begin
        pulse_stretcher_proc:
        process (clk, p_input)
                variable count: integer range 0 to stretch_factor;
                constant pulse_width: integer := stretch factor;
        begin
                -- Wait for clock leading edge
                if clk'event and clk = '1' then
                        if p_input = '1' then
                                count := pulse_width;
                        else
                                if count > 0 then
                                        count := count – 1;
                                else
                                        count := count;
                                end if;
                        end if;
                        if count > 0 then
                                p_output <= '1';
                        else
                                p_output <= '0';
                        end if;
                end if;
        end process pulse_stretcher_proc;
end pulse_stretcher_arch;
```

FIGS. 5 through 8 illustrate the results of an actual simulation of a synthesized CPLD implementation of the digital WIR demodulator illustrated in FIG. 4 and based on VHDL design modules in listings 1, 2, and 3 above. FIGS. 5 through 8 show the results of the same simulation with increasing levels of time detail. These levels of detail are noted when comparing the system clock 130, the modulated WIR input 132, the pulse detector output 134, and the pulse stretcher output/baseband WIR signals 136 for each of the figures.

Preferred embodiments of the present invention have been described herein. It will be understood, however, that changes may be made to the various features described without departing from the true spirit and scope of the invention, as defined by the following claims.

We claim:

1. A digital device for processing a modulated wireless wired infrared (WIR) input signal, said device comprising:
    an input receiving circuit that receives said modulated WIR input signal, said input receiving circuit detecting valid modulation carrier pulses in said WIR input signal wherein said valid modulated carrier pulses fall within a pulse width duration, and said input receiving circuit generating a valid pulse signal; and
    a pulse generating circuit operatively coupled to said input receiving circuit, said pulse generating circuit generating a stretched pulse signal based in part on said valid pulse signal generated by said input receiving circuit.

2. The invention of claim 1 wherein said digital device comprises a programmable digital processing device.

3. The invention of claim 2 wherein said programmable digital device comprises a complex programmable logic device.

4. The invention of claim 1 further comprising a signal conditioning circuit, said signal conditioning circuit operatively coupled to said input receiving circuit.

5. The invention of claim 4 wherein said signal conditioning circuit comprises an operational amplifier.

6. The invention of claim 1 wherein said modulated WIR input signal comprises a conditioned modulated WIR input signal.

7. The invention of claim 1 further comprising a command decoder operatively coupled to said pulse generating circuit, said command decoder decoding said pulse signal.

8. The invention of claim 7 wherein said command decoder decodes said pulse signal into an actual command for operation of a media management product.

9. The invention of claim 1 wherein said pulse signal comprises a baseband WIR signal.

10. The invention of claim 1 wherein said digital device comprises a WIR demodulator.

11. The invention of claim 1 wherein said input receiving circuit filters out spurious pulses in said input signal.

12. The invention of claim 1 wherein said pulse generating circuit generates said pulse signal based in part on an operating parameter.

13. The invention of claim 12 wherein said operating parameter comprises an input value of a system clock frequency ($F_{sys}$).

14. The invention of claim 1 wherein said pulse signal comprises a pulse signal of a specific duration.

15. A method for digitally processing a modulated wired infrared (WIR) input signal, said method comprising the steps of:
    detecting a valid modulation carrier pulse burst in said modulated WIR input signal wherein said valid modulated carrier pulses fall within a pulse width duration;
    generating a valid pulse signal based in part on said modulated WIR input signal; and
    generating a stretched pulse signal based in part on said valid pulse burst.

16. The invention of claim 15 further comprising the step of utilizing a signal conditioning circuit to condition said modulated WIR input signal.

17. The invention of claim 15 further comprising the step of communicating said pulse signal to a command decoder.

18. The invention of claim 17 further comprising the step of decoding said pulse signal to generate a decoded IR command.

19. The invention of claim 17 further comprising the step of decoding said pulse signal into an actual command for operation of a media management product.

20. The invention of claim 15 wherein said pulse signal comprises a baseband WIR signal.

21. The invention of claim 15 further comprising the step of filtering spurious pulses in said modulated WIR input signal.

22. The invention of claim 15 further comprising the step of generating said pulse signal of specific duration based in part on an operating parameter.

23. The invention of claim 22 wherein said operating parameter comprises an input value of a system clock frequency ($F_{sys}$).

24. A digital wired infrared demodulator for extracting a baseband IR control signal from a modulated wired infrared (WIR) input signal, said demodulator comprising:
    a carrier pulse detector, said carrier pulse detector receiving said modulated WIR input signal and generating a valid pulse signal based in part on at least one input parameters wherein said at least one input parameter comprises a pulse width duration; and
    a carrier pulse stretcher operatively coupled to an output of said carrier pulse detector and receiving said plurality of pulses
    wherein said carrier pulse stretcher generates a stretched baseband WIR signal based in part on said plurality of pulses.

25. The invention of claim 24 further comprising a signal conditioner.

26. The invention of claim 24 further comprising an IR command decoder operatively coupled to said carrier pulse stretcher.

27. The invention of claim 24 wherein said at least one input parameter is selected from a group comprising
    an input the system clock frequency ($F_{sys}$), a minimum allowable modulation carrier frequency ($Fc_{min}$), a maximum allowable modulation carrier frequency ($Fc_{max}$), a minimum allowable modulation carrier pulse duty cycle ($DCc_{min}$), or a maximum allowable modulation carrier duty cycle ($DCc_{cmax}$).

28. The invention of claim 24 wherein said digital wired infrared demodulator is programmable to demodulate at a plurality modulated WIR input signal having different carrier frequencies.

* * * * *

UNITED STATES PATENT AND TRADEMARK OFFICE
CERTIFICATE OF CORRECTION

PATENT NO. : 7,593,649 B1  
APPLICATION NO. : 10/935517  
DATED : September 22, 2009  
INVENTOR(S) : Talatinian et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1352 days.

Signed and Sealed this

Twenty-first Day of September, 2010

David J. Kappos  
*Director of the United States Patent and Trademark Office*